Patented Nov. 30, 1948

2,455,199

UNITED STATES PATENT OFFICE 2,455,199

METHOD OF BLANCHING NATURAL GUMS OR RESINS

Lawrence R. Van Allen, Chicago, Ill.

No Drawing. Application November 2, 1944,
Serial No. 561,645

4 Claims. (Cl. 106—236)

This invention relates to a method of blanching natural gums or resins. In the present invention I have provided a novel method of obtaining a change of orange shellac, seedlac, and the like (which is a red colored vegetable resin) to light yellow or white color, and am thus able to obtain a much desired white shellac varnish.

While in the description I refer to seedlac and shellac, I wish it understood that the invention is not limited thereto but includes the blanching of all natural gums or resins which are soluble in alcohol or similar organic solvents.

Among the objects of my invention is to accomplish the above advantages, and provide a method of blanching natural gums or resins, that is much more simple than any other method heretofore known, and effective to produce a highly desirable white shellac varnish, or other resin varnishes such as copal gums and fossil gums.

A further object is to eliminate many of the steps in the methods heretofore employed.

A still further object is to provide a novel method in which the properties desired in white shellac varnish for commercial uses, such as wood surfacing, adhesiveness, stiffening quality to fabric, paper finishes, and other properties, are equal to or better than in shellac which was treated to remove color by previous methods.

Another object is to eliminate a great amount of labor, time and expensive equipment, that were necessary prior to my invention.

Other objects, advantages and capabilities, inherently possessed by my invention, will later more fully appear.

In carrying out the present invention I first clean the natural seedlac or shellac in any desired manner. One method of cleaning is by washing in hot water. Next I mix by agitation the cleaned seedlac or shellac in alcohol to which has been added from 1 to 5% by weight of sodium chlorite (technical) $NaClO_2$, that is, 1 to 5% of sodium chlorite to 99 to 95% of seedlac or shellac disregarding the alcohol. This so-called "cutting" of the gum shellac in alcohol produces a material that is of high solid content. The total amount of alcohol used is sufficient to dissolve the seedlac or the shellac.

Next I add a quantity of ethyl alcohol or methyl alcohol, or other suitable solvent, which has been acidified to about pH3 to 5 by the addition of any well known suitable acid, and which is gradually added to the heavy cut shellac and alcohol solution until the desired weight per gallon of resin or shellac to solvent is effected. This is continuously agitated for some time, as a result of which the desired decoloration is effected. Finally to neutralize possible chlorine remaining in the solvent-shellac solution I add sufficient (1 to 4%) hydrogen peroxide, or other peroxides or dioxides, which also act as a fixative of the light color of the shellac or other resins, in solution.

It is thus seen that I have greatly simplified and improved the methods heretofore known for blanching natural gums or resins, and have eliminated a great amount of labor, time and equipment previously required, without sacrificing any of the desired qualities or effectiveness of the finished product. In the present invention, expensive equipment is not necessary. By technical sodium chlorite I mean sodium chlorite that is not 100% pure, but which may have some impurities in it.

While I have for illustrative purposes only, described one manner of carrying out my new method, I wish it understood that the same is susceptible of modification and change without departing from the spirit of my invention.

Having described my invention I claim:

1. The method of blanching seedlac and shellac, hereinafter referred to as lac, which consists in agitating the lac in alcohol, to which alcohol has been added from 1 to 5 per cent by weight of technical sodium chlorite with relation to the lac content of the alcohol-lac solution, the total amount of alcohol used being sufficient to dissolve the lac, gradually adding a quantity of alcohol which has been acidified to about pH3 to 5, and agitating the mixture.

2. The method of blanching seedlac and shellac, hereinafter individually referred to as lac, which consists in agitating the lac in alcohol to which has been added from 1 to 5 per cent of sodium chlorite with relation to the lac content in the alcohol-lac solution, the total amount of alcohol used being sufficient to dissolve the lac, gradually adding a quantity of alcohol which has been acidified to about pH3 to 5, and finally adding approximately 1 per cent hydrogen peroxide.

3. The method of blanching seedlac and shellac, hereinafter individually referred to as lac, which consists in agitating the lac in a mixture of alcohol and from 1 to 5 percent by weight of sodium chlorite, with relation to the lac content in the alcohol-lac solution, the total amount of alcohol used being sufficient to dissolve the seedlac or shellac, adding alcohol which has been acidified to about pH3 to 5, agitating the same until the desired decoloration results, and adding from 1 to 4 percent hydrogen peroxide.

4. The method of blanching seedlac and shellac, hereinafter individually referred to as lac, which consists in adding to the lac alcohol to which has been added 1 to 5 per cent by weight with relation to the lac content of the alcohol-lac solution of sodium chlorite, the amount of alcohol being sufficient to dissolve the lac, and acidifying the mixture.

LAWRENCE R. VAN ALLEN.

REFERENCES CITED

The following references are of record in the file of this patent:

UNITED STATES PATENTS

| Number | Name | Date |
|---|---|---|
| 504,064 | Field | Aug. 29, 1893 |
| 1,066,794 | Cassard | July 8, 1913 |

OTHER REFERENCES

Chemical Age, September 17, 1938, "A Note on the Bleaching of Lac," by Gidvani, page 212.